(12) United States Patent
Orlando

(10) Patent No.: US 12,185,877 B1
(45) Date of Patent: Jan. 7, 2025

(54) EGG CRACKING FIXTURE TO IMPROVE THE EGG COOKING PAN

(71) Applicant: Sam Orlando, Bloomfield Hills, MI (US)

(72) Inventor: Sam Orlando, Bloomfield Hills, MI (US)

( * ) Notice: Subject to any disclaimer, the term of this patent is extended or adjusted under 35 U.S.C. 154(b) by 0 days.

(21) Appl. No.: 18/806,866

(22) Filed: Aug. 16, 2024

(51) Int. Cl.
*A47J 43/14* (2006.01)
*A47J 36/16* (2006.01)

(52) U.S. Cl.
CPC ............... *A47J 43/14* (2013.01); *A47J 36/16* (2013.01)

(58) Field of Classification Search
CPC .................................. A47J 36/16; A47J 43/14
See application file for complete search history.

(56) References Cited

U.S. PATENT DOCUMENTS

| | | | | |
|---|---|---|---|---|
| 2,383,245 A * | 8/1945 | Fedje | A47J 43/14 | 99/581 |
| 2,404,130 A * | 7/1946 | Frank | A47J 43/14 | 99/413 |
| 3,494,397 A * | 2/1970 | Sparks | A47J 43/14 | D7/693 |
| 3,717,088 A * | 2/1973 | Urbonas | A47J 37/10 | 99/574 |
| 4,665,813 A * | 5/1987 | Maisonneuve | A47J 43/14 | D7/693 |
| 5,784,953 A * | 7/1998 | Wang | A47J 43/14 | 99/497 |
| D762,427 S * | 8/2016 | Tennant | | D7/693 |
| 2003/0192437 A1 * | 10/2003 | Christiansen | A47J 43/14 | 99/568 |
| 2007/0205210 A1 * | 9/2007 | Powell | A47J 29/00 | 220/573.1 |
| 2012/0037639 A1 * | 2/2012 | Gotsis | A47J 45/071 | 220/573.4 |

* cited by examiner

*Primary Examiner* — Sean M Michalski

(57) ABSTRACT

The egg-cracking fixture has a base portion adapted for conformal integration with the sidewall of the skillet, and further has a tapered body that extends away from the base to define sloping side walls and an elongated egg cracking ridge. The ridge is thus disposed within the confines of the skillet, generally above the pan bottom and inwardly from the rim. The egg-cracking fixture can be attached to the skillet in a variety of ways, including different removably attaching ways to allow the user to choose from among fixtures of different egg-cracking profiles.

18 Claims, 6 Drawing Sheets

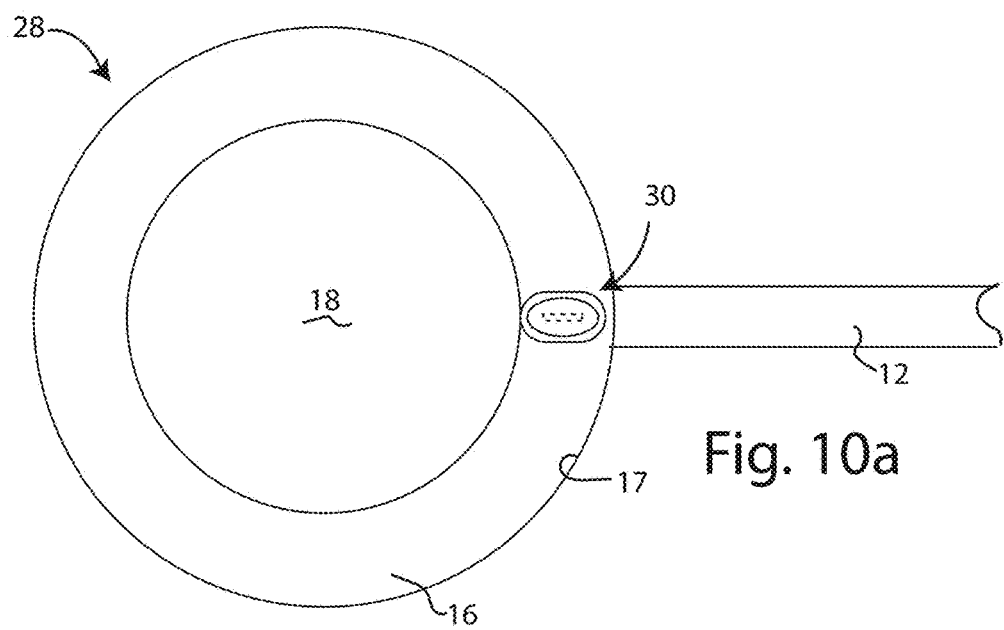
Fig. 10a
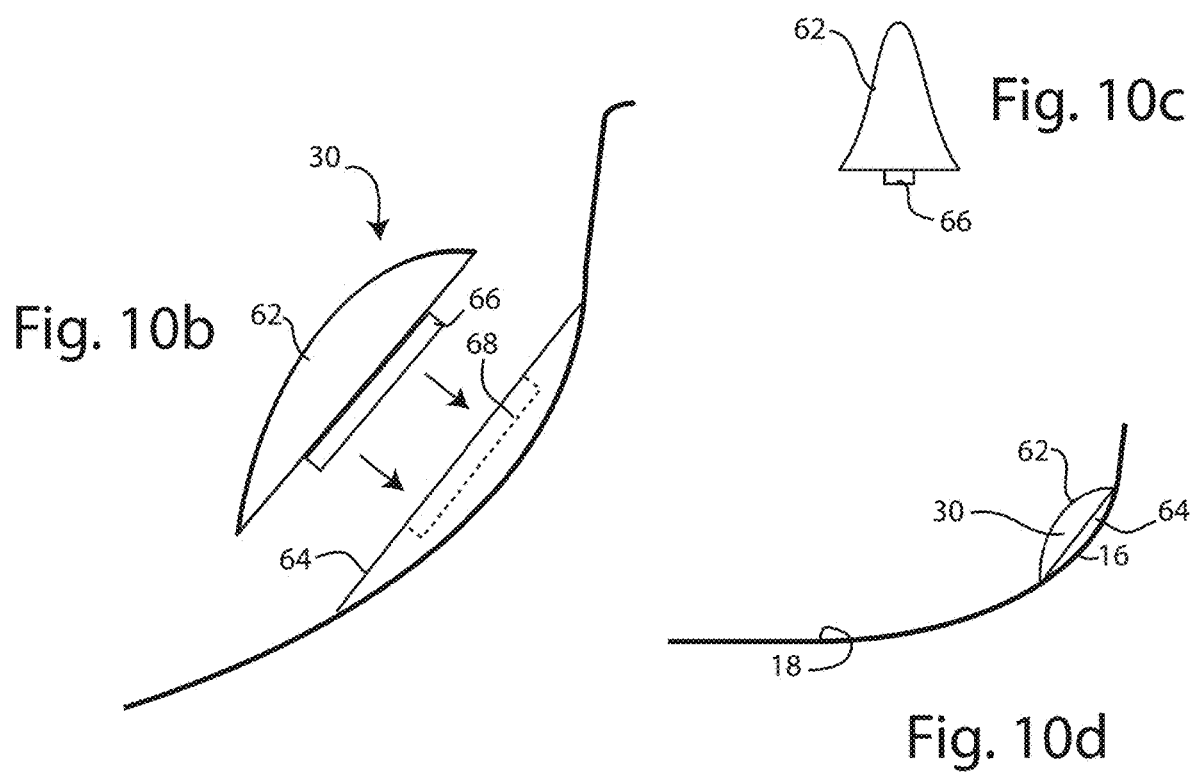
Fig. 10b
Fig. 10c
Fig. 10d

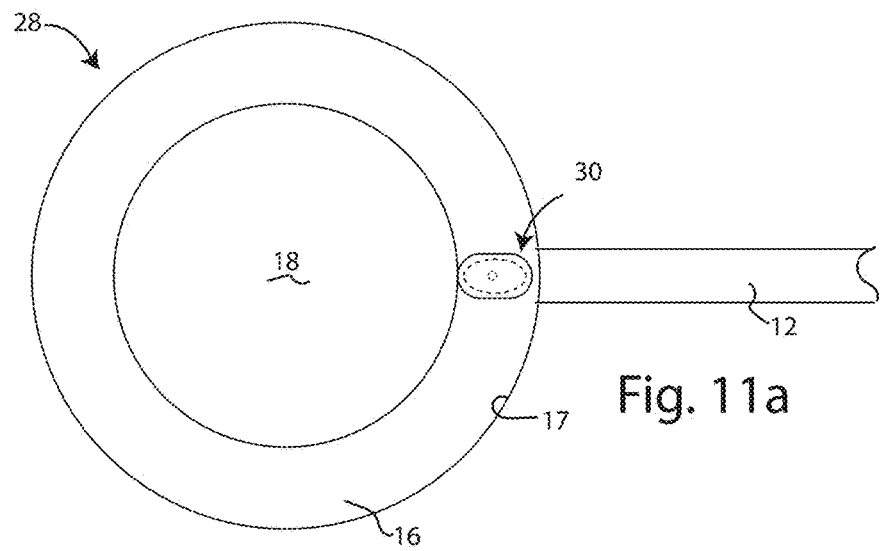
Fig. 11a
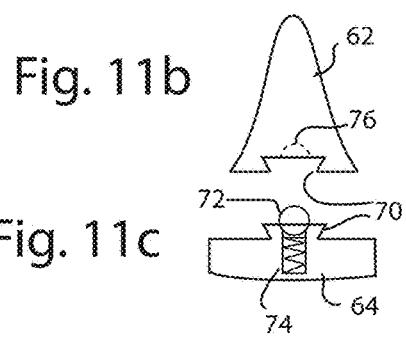
Fig. 11b
Fig. 11c
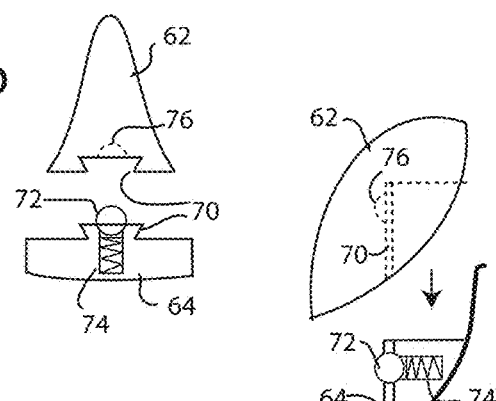
Fig. 11d

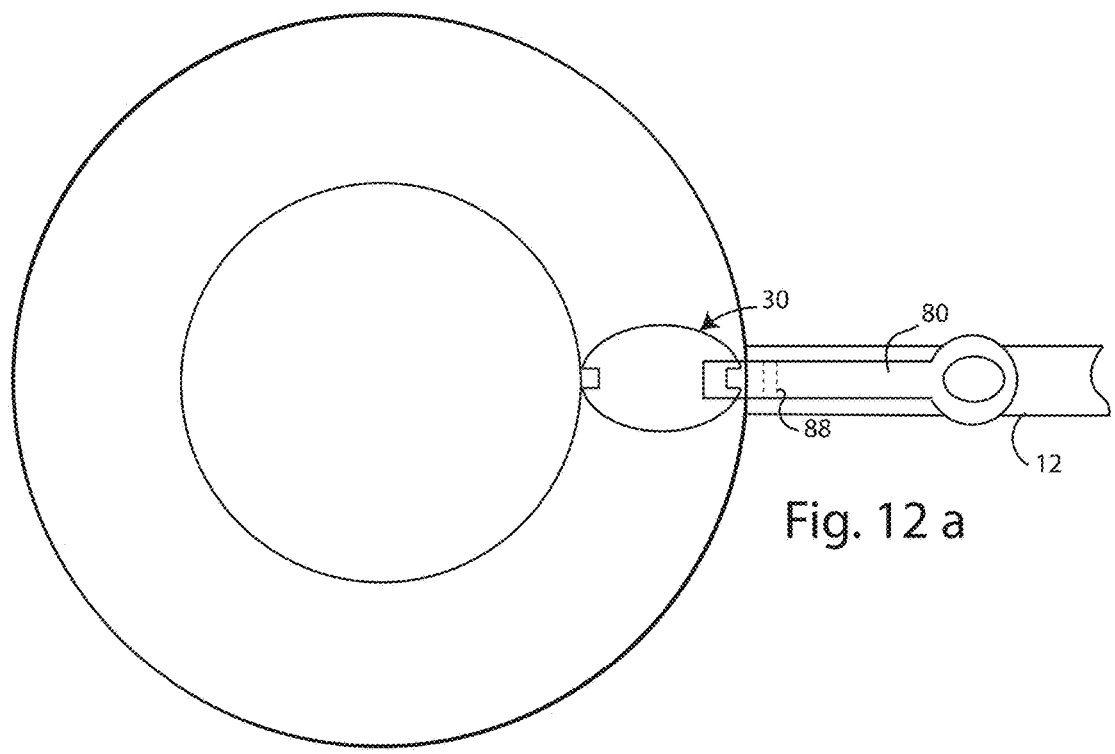
Fig. 12 a
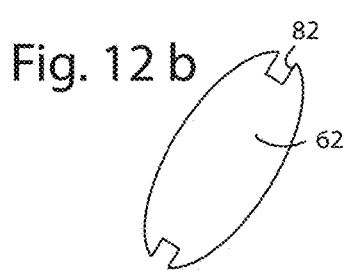
Fig. 12 b
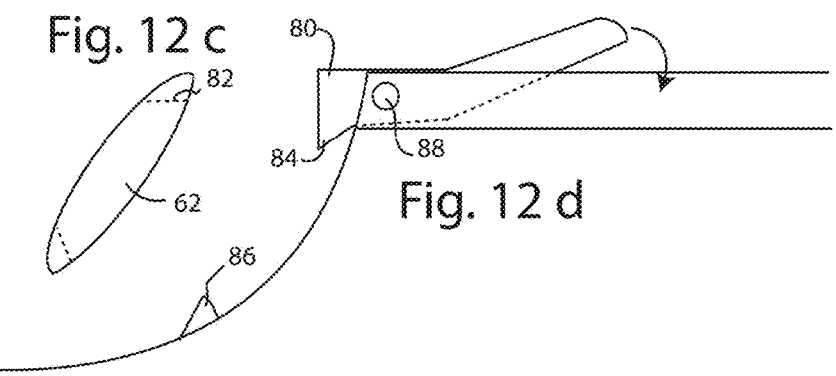
Fig. 12 c
Fig. 12 d
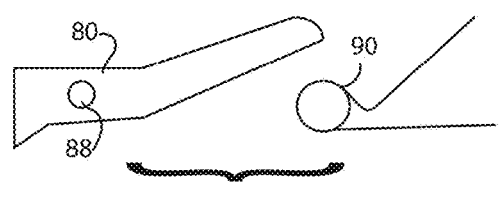
Fig. 12 e
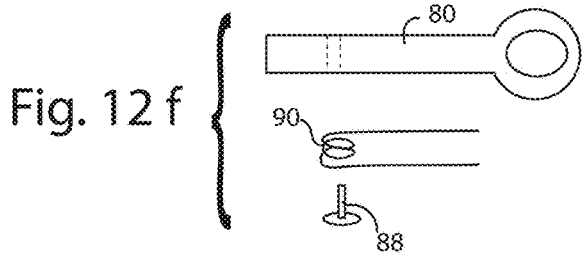
Fig. 12 f

EGG CRACKING FIXTURE TO IMPROVE THE EGG COOKING PAN

TECHNICAL FIELD

This disclosure relates generally to an egg cracking fixture for egg cooking pans and skillets. More particularly the disclosure relates to an egg cracking fixture to facilitate the cracking and depositing of the egg into the cooking pan or skillet in a such manner so that eggshells do not fall into the pan and so the egg whites and yoke do not run down the outer sidewalls of the pan or skillet.

BACKGROUND

This section provides background information related to the present disclosure which is not necessarily prior art.

As breakfast restaurant owners can attest, one encounters a wide range of skill when it comes to short order cooks. This is evident in the seemingly simple task of cooking an egg. Newly trained cooks often have difficulty cracking eggs on the edge of the pan without having specks of eggshell fall into the pan and without letting some of the egg white run down and cling to the outer sidewall of the pan where it burns and gives off unpleasant odors. Indeed, even more experienced cooks will occasionally make the aforesaid egg cracking errors as they race to keep up with orders during the peak breakfast hours.

SUMMARY

The disclosed egg cracking fixture solves the aforesaid problems by providing an egg-cracking fixture having a base portion adapted for conformal integration with the sidewall of the skillet, and further having a tapered body that extends away from the base to define sloping side walls and an elongated egg cracking ridge. The ridge is thus disposed within the confines of the skillet, generally above the pan bottom and inwardly from the rim. Various egg-cracking ridge shapes and means of attachment are disclosed.

BRIEF DESCRIPTION OF THE DRAWINGS

The drawings described herein are for illustrative purposes of selected embodiments and not all possible implementations. The particular choice of drawings is not intended to limit the scope of the present disclosure.

Profiles

Figure 5:
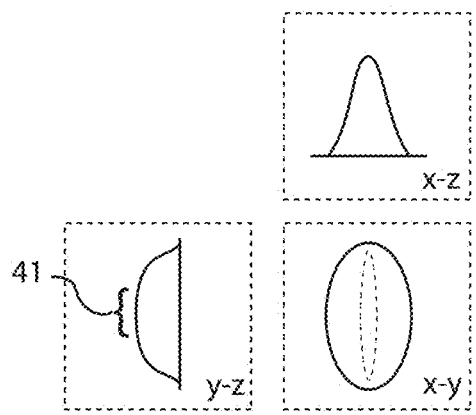
Figure 6:
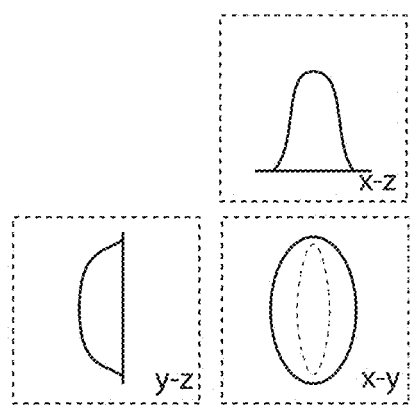
Figure 7:
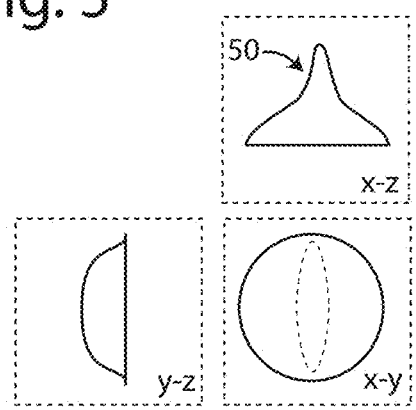
Figure 8:
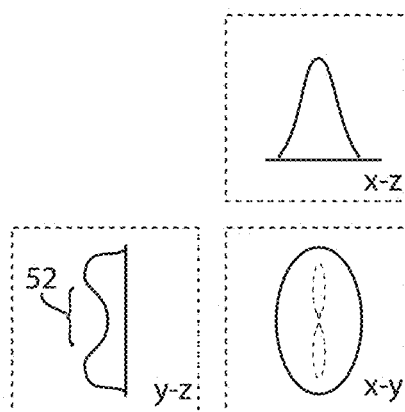
Figure 9:
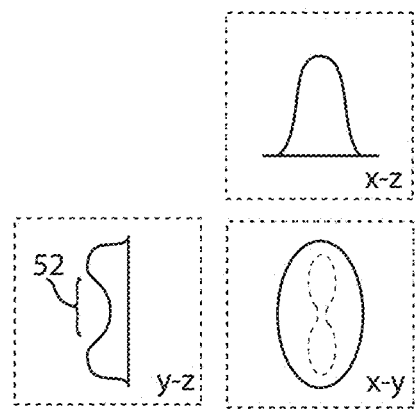

FIG. 5 depicts a first embodiment of egg cracking fixture having a single, elongated sharp-edged egg-cracking ridge. More specifically FIG. 5 illustrates the three-dimensional shape of the egg-cracking ridge as seen looking in the top down (x-y plane), broadside (y-z plane) and end side (x-z plane) directions;

FIG. 6 depicts a second embodiment of egg cracking fixture having a single, elongated blunt-edged egg-cracking ridge. More specifically FIG. 6 illustrates the three-dimensional shape of the egg-cracking ridge as seen looking in the top down (x-y plane), broadside (y-z plane) and end side (x-z plane) directions;

FIG. 7 depicts a third embodiment of egg cracking fixture having a single, elongated sharp-edged egg-cracking ridge with steep sidewalls. More specifically FIG. 7 illustrates the three-dimensional shape of the egg-cracking ridge as seen looking in the top down (x-y plane), broadside (y-z plane) and end side (x-z plane) directions;

FIG. 8 depicts a fourth embodiment of egg cracking fixture having a double-hump, elongated sharp-edged egg-cracking ridge. More specifically FIG. 8 illustrates the three-dimensional shape of the egg-cracking ridge as seen looking in the top down (x-y plane), broadside (y-z plane) and end side (x-z plane) directions;

FIG. 9 depicts a fifth embodiment of egg cracking fixture having a double-hump, elongated blunt-edged egg-cracking ridge. More specifically FIG. 9 illustrates the three-dimensional shape of the egg-cracking ridge as seen looking in the top down (x-y plane), broadside (y-z plane) and end side (x-z plane) directions;

Removable Attachment Examples

Figure 13A:
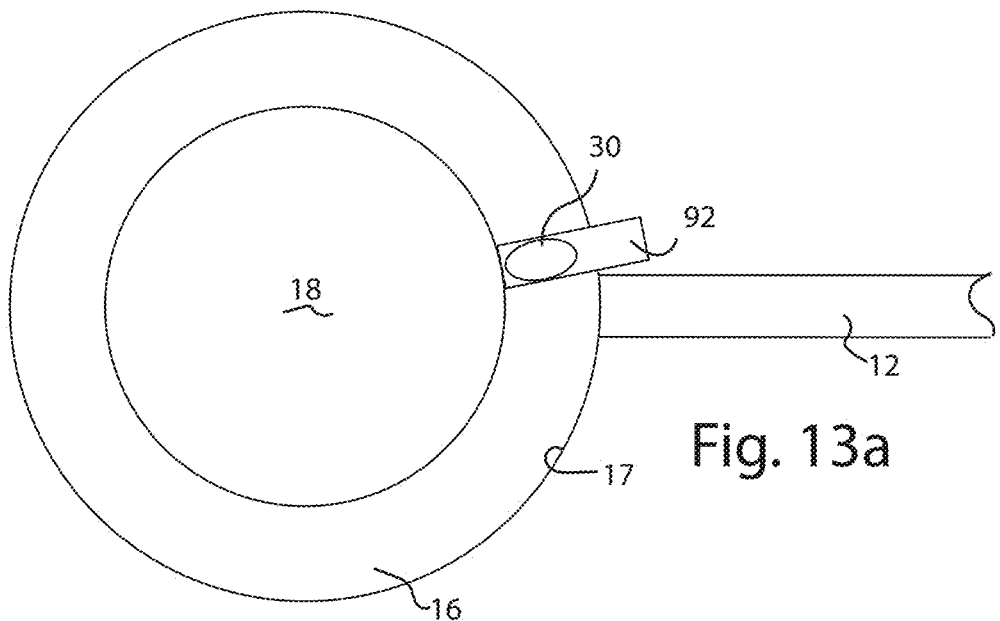
Figure 13B:
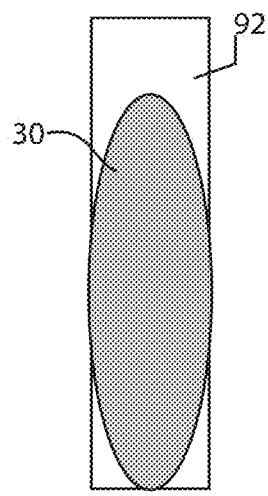
Figure 13C:
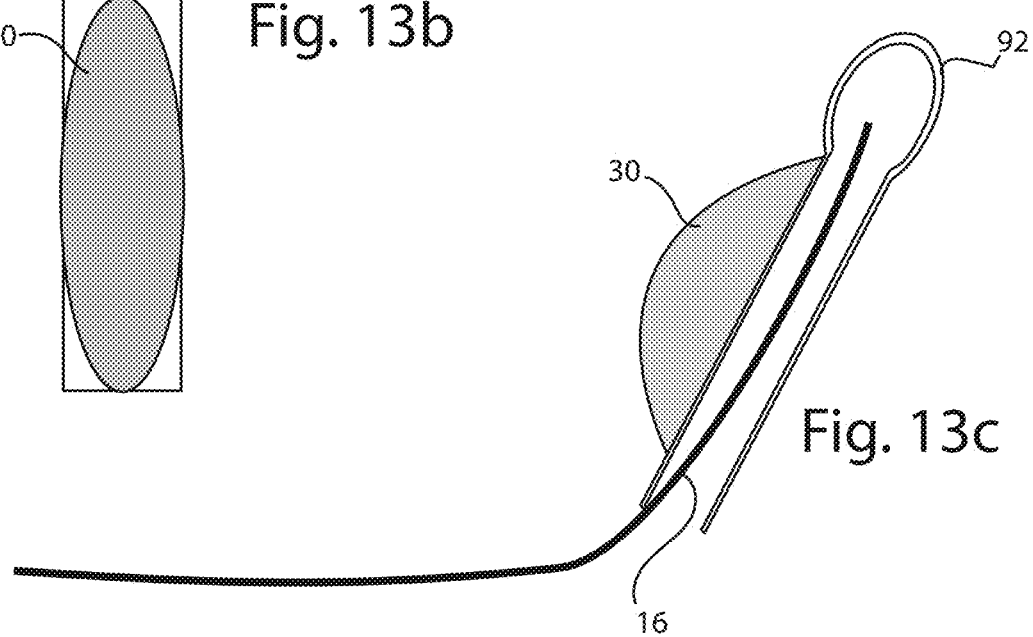

FIGS. 10*a*-10*d* (collectively FIG. 10) depict a first means of attaching the egg cracking fixture to the pan or skillet using a magnet;

FIGS. 11*a*-11*d* (collectively FIG. 11) depict a second means of attaching the egg cracking fixture to the pan or skillet using a guide rail and ball detent mechanism;

FIGS. 12*a*-12*f* (collectively FIG. 12) depicts a third means of attaching the egg cracking fixture to the pan or skillet using a lever lock mechanism; and FIGS. 13*a*-13*c* (collectively FIG. 13 depicts a fourth means of attaching the egg cracking fixture to the pan or skillet using a clip-on self-spring loaded fastener.

DETAILED DESCRIPTION

Figure 1:
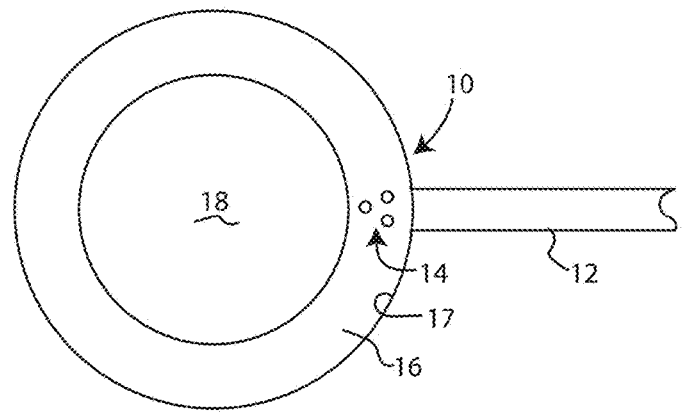
FIG. 1 is a prior art skillet with handle riveted to the skillet body.

FIG. 1 illustrates a conventional egg cooking pan 10 with handle portion 12. In this conventional embodiment the handle 12 is held in place by three rivets 14. The pan has a flat circular bottom 18 with an annular, upwardly extending side wall 16 which defines the pan's circular rim 17. In conventional use a typical cook will crack an egg 20 (FIGS. 2*a* and 2*b*) by striking it along the rim 17, with the objective to produce an elongated crack 24 as illustrated in FIG. 2*b*. The goal is to produce a singular crack of sufficient length to allow the cook to insert his or her opposing thumbs into the crack and then pry the two eggshell halves apart so that the egg white and yoke fall into the pan. However, quite often, some of the egg white will inadvertently adhere to the outside of the pan, where it runs down the side of the pan and burns, giving off an unpleasant odor.

Figure 2A:
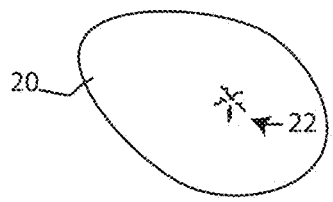
FIG. 2*a* illustrates an exemplary egg, showing results of a small impact by a substantially circular device featuring radial cracking fissures in the eggshell which are difficult to open by the cook's opposing thumbs.
Figure 2B:
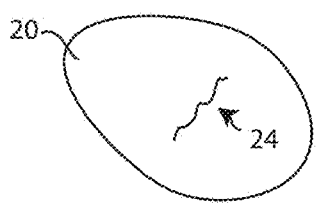
FIG. 2*b* illustrates an exemplary egg, showing results of a moderate impact by an improved elongated fixture, featuring a singular, substantially elongated cracking fissure in the eggshell which is readily opened by inserting the cook's opposing thumbs.

If the cook were to hit the egg gently on one of the rivets 14, the result would be a small hole with a series of radial fissures, as shown at 22 in FIG. 2*a*. Such small hole with radial fissures is generally inadequate to pry two eggshell halves apart with the thumbs due to its circular nature and small size. Striking the egg harder on one of the rivets, in an effort to make a larger thumb-sized hole will break off flecks of eggshell which fall into the pan where the egg is to be cooked-a very undesirable result as customers do not enjoy the crunch of eggshell in their breakfast omelet.

Figure 3:
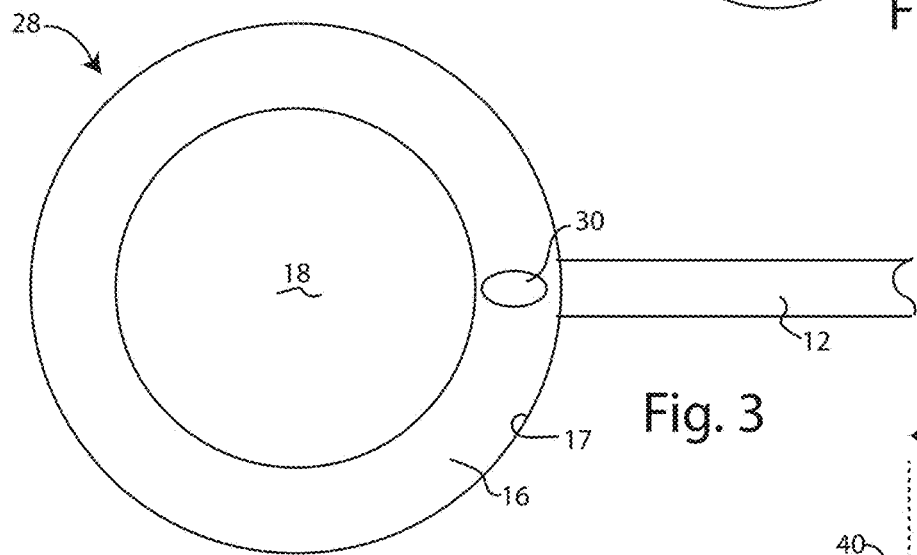
FIG. 3 illustrates an egg cooking pan or skillet with the inclusion of the disclosed egg cracking fixture according to the disclosure.
Figure 4:
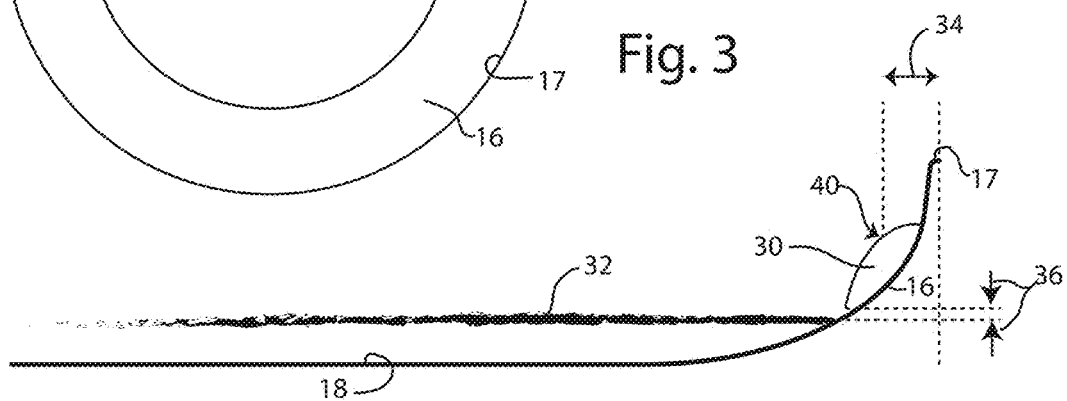
FIG. 4 is a partial cross-sectional view of the pan and egg cracking fixture of FIG. 3, useful in understanding the placement of the fixture relative to the egg cooking surface and the pan sidewalls.

The improved egg cooking pan 28 is shown in FIGS. 3 and 4 and includes an egg cracking fixture 30 disposed on the inner sidewall of the circular rim 17. In the illustrated embodiment the cracking fixture 30 is positioned in line with the handle portion 12 which locates the fixture where it is easily used by both left-handed and right-handed cooks. A right-handed cook would typically steady the pan by holding handle 12 with the left hand while holding the egg with the right, and vice versa for a left-handed cook.

FIG. 4 shows the precise location of the cracking fixture 30 relative to the pan circumferential edge 17 and relative to the uppermost surface 32 of the egg dish being cooked. In FIG. 4, the illustrated exemplary egg dish is shown as having the thickness of a multi-egg omelet. The cracking fixture is positioned above the anticipated height of the egg dish, so that the egg dish can be turned and lifted from the pan with a spatula, without coming into contact with the cracking fixture 30. Thus the lowermost extent of the fixture 30 is spaced above the anticipated height of the egg dish by distance shown at 36.

The cracking fixture presents an elongated cracking edge 40 which is entirely disposed within the confines of the interior of the pan. The edge 40 thus lies radially inward of the of the rim 17, as indicated by spacing 34. This elongated cracking edge 40 is specifically designed to produce an elongated crack in the egg, such as illustrated in FIG. 2b at 24. As can be seen in FIG. 4, when the egg is cracked by moderate impact with the elongated cracking edge 40, any egg white that drips from the freshly cracked egg will fall into the pan and will not run down the outside of the pan. Being elongated, the cracking edge 40 produces an elongated crack (FIG. 2b) which can be readily opened by the cook's opposing thumbs. As such there is very low likelihood of having flecks of eggshell falling into the pan.

FIGS. 5-9 illustrate different cracking fixture shape embodiments. The first embodiment (FIG. 5) features a single, elongated, sharp-edged egg-cracking ridge. When struck with the egg, this embodiment presents a single ridge which makes first impact the eggshell along a straight, linear region illustrated at 41 in the y-z plane. This impact creates a linear, elongated crack in the eggshell, as illustrated at 24 in FIG. 2b. As the momentum of the egg drivers it further onto the cracking fixture the egg encounters the gradually tapered end regions of the ridge, which gradually elongates the crack further, in accord with FIG. 2b. Meanwhile, the gradually tapered sidewalls 44 in the x-z plane (FIG. 5) gradually but increasingly open a hole in the eggshell to allow the thumbs to be inserted to crack the shell in two so that the egg can be gently slid into the skillet.

The second embodiment (FIG. 6) features an elongated blunt-edged egg-cracking ridge. Compared with the first embodiment, the second embodiment presents a wider surface upon impact. This difference can be seen by comparing these respective embodiments in the x-y plane, in which the ridge shape is illustrated in dotted lines. The blunt ridge of the second embodiment delivers initial impact over a slightly wider area, allowing the eggshell to crack more fully before the ridge is driven into the interior of the egg.

The third embodiment (FIG. 7) features a single, elongated, sharp-edged egg-cracking ridge, with steep sidewalls 50 as seen in the x-z plane. Compared with the first and second embodiments, the steep sidewalls 50 allow the of the ridge to drive deeper into the egg upon first impact.

The fourth embodiment (FIG. 8) features a double-hump, elongated sharp-edged egg-cracking ridge. The fifth embodiment (FIG. 9) features a double-hump, elongated blunt-edged egg-cracking ridge. In both of these embodiments, the double humps are spaced apart to define a valley 52 that cradles the exterior shape of the eggshell. This cradling shape allows the ridge to make contact with a wider circumferential area of the shell surface, thereby producing a clean, elongated crack in the shell. As compared with the first, second and third embodiments which, present a convex ridge, the fourth and fifth embodiments present a concave ridge.

Fixture Means of Attachment—Permanent and Detachable Examples

The egg cracking fixture and the associated egg cooking pan can be manufactured in a variety of ways. The fixture shape can be stamped into the body of the pan as it is manufactured; or welded or bonded to it. It can be molded and affixed by adhesive to pan in the location shown in FIG. 4. It can be fabricated to include one or more rivet shanks or threaded fasteners, so that the fixture functions as the rivet head or fastener head. In such case the rivet shank(s) or threaded fastener threads pass through holes in the pan sidewall to optionally secure the pan handle.

If desired, the egg cooking pan can be supplied with a kit of different egg-cracking fixture shapes, such as illustrated in FIGS. 5-9, allowing the user to try different fixtures and choose a favorite for ultimate attachment. In such embodiment a variety of different fastening techniques may be used as a means of attaching the egg cracking fixture to the pan or skillet. FIGS. 10-13 illustrate different fastening techniques. Other variations are also possible.

Magnetic Fastening

FIGS. 10a-10d (collectively FIG. 10) illustrate a magnetically affixed embodiment. The egg cracking fixture shown generally at 30 comprises an outwardly exposed cracking portion which is affixed to a base portion 64. The base portion may be suitably affixed to the pan surface by bonding, welding or integrally stamped into the body of the pan. The base portion is fabricated to include a magnetic material. The exposed cracking portion is likewise provided with a magnet 66 for attachment by magnetic attraction to the base portion. The base portion is provided with a rectangular recess 68, sized to receive the rectangular shape of magnet 66. Registration of the magnet 66 with the recess 68 prevents the exposed cracking portion from lateral or rotational movement once installed. The user can swap out one fixture shape for another by simply pulling the cracking portion with sufficient force to break it free of the magnetic bond.

Detent Fastening

FIGS. 11a-11d (collectively FIG. 11) illustrate a detent fastening mechanism for removably securing the outwardly exposed cracking portion 62 (FIG. 11b) to its base portion 64 (FIG. 11c). The cracking portion 62 slidably mates with the base portion 64, constrained by the mating dovetail rail structure illustrated at 70. A spring-loaded ball (72, 74) engages with a recess 76 in the cracking portion to hold the cracking portion and base portion fixedly together once the cracking portion is slid fully onto the rail structure. See FIG. 11d. The user can swap out one fixture shape for another by simply pulling up on the cracking portion until the spring-loaded ball clears the recess.

Lever Lock Fastening

FIGS. 12a-12f (collectively FIG. 12) illustrate a lever-lock embodiment. The cracking fixture has notched regions 82 (FIGS. 12b and 12c). A lower notched region is adapted to engage a small tang 86 (FIG. 12d) formed in the bottom sidewall of the pan or skillet. The upper notched region is adapted to engage with a tang 84 formed on the end of a lever 80. The lever is affixed to the handle 12 using suitable fulcrum pin 88, allowing the tang 84 to be raised and lowered by rocking action of the lever. A spring 90 (FIGS. 12e and 12f) biases the lever towards the tang-engaging position (a counterclockwise rotation as in FIG. 12d). The user can press the lever downwardly at the handle (a clockwise rotation) to release the tang 84 from engagement with the upper notched region cracking fixture. Thus to install a cracking fixture the user inserts the lower notch into engagement with tang 86 in the bottom sidewall of the pan, depresses the lever to rotate the tang 84 upwardly, positions the cracking fixture in position against the sidewall of the skillet and releases the lever 80 to engage the upper notch with tang 84.

Clip-on Fastening

FIGS. 13a-13c (collectively, FIG. 13) illustrates a clip-on fastening means where the cracking fixture 30 is bonded to a generally u-shaped spring clip 92. The clip 92 slides downwardly over the sidewall 16 of the skillet. In this embodiment, different cracking fixture shapes may each be bonded to its own clip.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An egg cracker for an egg cooking skillet of the type having a pan bottom, an enclosing sidewall extending around the periphery of the pan bottom to define a rim, the egg cracker comprising:
   an egg-cracking fixture having a base portion adapted for conformal integration with the sidewall of the skillet,
   the fixture further having a tapered body that extends away from the base to define sloping side walls and an elongated egg-cracking ridge;
   the ridge being disposed within the confines of the skillet, generally above the pan bottom and inwardly from the rim.

2. The egg cracker of claim 1 wherein the egg-cracking ridge defines a single, elongated, sharp-edged egg-cracking ridge.

3. The egg cracker of claim 1 wherein the egg-cracking ridge defines an elongated blunt-edged egg-cracking ridge.

4. The egg cracker of claim 1 wherein the egg-cracking ridge defines a single, elongated, sharp-edged egg-cracking ridge, with steep sidewalls.

5. The egg cracker of claim 1 wherein the egg-cracking ridge defines a double-hump, elongated sharp-edged egg-cracking ridge.

6. The egg cracker of claim 1 wherein the egg-cracking ridge defines a double-hump, elongated blunt-edged egg-cracking ridge.

7. The egg cracker of claim 1 wherein the egg-cracking ridge defines a convex ridge.

8. The egg cracker of claim 1 wherein the egg-cracking ridge defines a concave ridge.

9. The egg cracker of claim 8 wherein the concave ridge conforms to the exterior shape of an egg.

10. The egg cracker of claim 1 wherein the egg-cracking fixture is formed in the skillet by machining or stamping.

11. The egg cracker of claim 1 wherein the egg-cracking fixture is permanently attached to the skillet by welding, bonding, rivets or threaded fasteners.

12. The egg cracker of claim 1 further comprising a means of removably attaching the egg-cracking fixture to the pan.

13. The egg cracker of claim 12 wherein the means of removably attaching is implemented using at least one magnet.

14. The egg cracker of claim 12 wherein the means of removably attaching is implemented using a detent fastener.

15. The egg cracker of claim 12 wherein the means of removably attaching is implemented using a lever lock fastener.

16. The egg cracker of claim 12 wherein the means of removably attaching is implemented using a clip-on fastener.

17. An egg cracker for an egg cooking skillet of the type having a pan bottom, an enclosing sidewall extending around the periphery of the pan bottom to define a rim, the egg cracker comprising:
   a kit of different egg cracking fixtures, each having a base portion adapted for conformal integration with the sidewall of the skillet,
   each fixture further having a tapered body that extends away from the base to define sloping side walls and an elongated egg-cracking ridge;
   an attachment means by which a selected one of the kit is removably secured to the skillet such that the ridge is disposed within the confines of the skillet, generally above the pan bottom and inwardly from the rim.

18. The egg cracker of claim 17 wherein the kit of different egg cracking fixtures includes a plurality of fixtures selected from the group consisting essentially of:
   a first fixture having an egg-cracking ridge which defines an elongated sharp edge;
   a second fixture having an elongated blunt edge;
   a third fixture having a single elongated sharp edge with steep sidewalls;
   a fourth fixture having a double-hump, elongated sharp edge;
   a fifth fixture having a double-hump, elongated blunt edge; and combinations thereof.

* * * * *